(12) United States Patent
Headley et al.

(10) Patent No.: US 8,226,381 B2
(45) Date of Patent: Jul. 24, 2012

(54) CHECK VALVE HAVING INTEGRALLY FORMED SEAT AND SEAL BODY

(75) Inventors: Thomas R. Headley, Bryan, OH (US); Lloyd I. Towne, Bryan, OH (US)

(73) Assignee: Ingersoll Rand Company, Montvale, NJ (US)

( * ) Notice: Subject to any disclaimer, the term of this patent is extended or adjusted under 35 U.S.C. 154(b) by 336 days.

(21) Appl. No.: 12/577,983

(22) Filed: Oct. 13, 2009

(65) Prior Publication Data

US 2010/0028174 A1 Feb. 4, 2010

Related U.S. Application Data

(62) Division of application No. 11/591,156, filed on Nov. 1, 2006, now Pat. No. 7,600,532.

(51) Int. Cl.
*F04B 45/00* (2006.01)
*F04B 43/06* (2006.01)
(52) U.S. Cl. .................................................. 417/395
(58) Field of Classification Search .................. 417/267, 417/395, 404, 413.1, 418, 559, 567, 568; 137/515.7, 533.16
See application file for complete search history.

(56) References Cited

U.S. PATENT DOCUMENTS

| | | | |
|---|---|---|---|
| 3,220,351 A | 11/1965 | Kling | |
| 3,346,008 A * | 10/1967 | Scaramucci | 137/516.29 |
| 3,359,995 A | 12/1967 | Parisi et al. | |
| 3,791,769 A | 2/1974 | Kovacs | |
| 3,806,285 A | 4/1974 | Sech | |
| 3,906,986 A | 9/1975 | Zurit et al. | |
| 4,247,264 A | 1/1981 | Wilden | |
| 4,446,886 A | 5/1984 | Taylor et al. | |
| 4,532,958 A | 8/1985 | Napolitano | |
| 4,611,788 A | 9/1986 | Thomsen | |
| 4,662,392 A | 5/1987 | Vadasz | |
| 4,880,209 A | 11/1989 | Bernat | |
| 4,895,499 A | 1/1990 | Gargas | |
| 5,819,792 A | 10/1998 | Reynolds | |
| 6,024,121 A | 2/2000 | Anderson | |
| 6,142,749 A * | 11/2000 | Jack et al. | 417/395 |
| RE38,239 E | 8/2003 | Duncan | |
| 7,063,516 B2 * | 6/2006 | Bethel | 417/395 |
| 7,600,532 B2 * | 10/2009 | Headley et al. | 137/515.7 |
| 2005/0031467 A1 * | 2/2005 | Caldwell | 417/395 |

FOREIGN PATENT DOCUMENTS

| | | |
|---|---|---|
| EP | 0408127 A2 | 1/1991 |
| GB | 2119867 A | 11/1983 |

* cited by examiner

*Primary Examiner* — Devon Kramer
*Assistant Examiner* — Amene Bayou
(74) *Attorney, Agent, or Firm* — Michael Best & Friedrich LLP

(57) ABSTRACT

A valve assembly includes first and second conduits having respective first and second flanges in abutment with each other, a stopper in the second conduit, and a valve body secured between the first and second flanges. The valve body includes a body bore in communication between the first and second conduits. The body bore defines a circular opening in one end of the valve body. The valve body also includes a circumferential notch that substantially insulates the circular opening from distortion arising from securing the valve body. The stopper snuggly seats against the circular opening to prevent fluid flow from the second conduit to the first conduit, but unseats to permit fluid flow from the first conduit to the second conduit. An o-ring may surround a portion of the valve body and be energized as the valve body is secured. A lip may surround the circular opening to provide a seat for the stopper.

6 Claims, 6 Drawing Sheets

CHECK VALVE HAVING INTEGRALLY FORMED SEAT AND SEAL BODY

CROSS REFERENCE TO RELATED APPLICATIONS

The present application is a divisional application of application Ser. No. 11/591,156, filed Nov. 1, 2006, the contents of which are herein incorporated by reference.

BACKGROUND

The present invention relates to a check valve having an integrally formed seat and seal body.

SUMMARY

The invention provides a valve assembly, which may be used in a double diaphragm pump or other application in which one-way flow of fluid is desired. The valve assembly includes a first conduit having a first flange; a second conduit having a second flange abutting against the first flange; a stopper; and a valve body. The valve body includes a circumferential notch that divides the body into first and second portions between the notch and respective first and second opposite ends of the body. The valve body also includes a body bore extending through the valve body between the first and second ends. The body bore defines a circular opening in the second end of the body, and communicates between the first and second conduits. During assembly, the valve body is secured between the first and second flanges and the notch substantially insulates the circular opening from distortion arising from such securing. The stopper snuggly seats against the circular opening to prevent fluid flow through the body bore from the second end to the first end, and unseats from the circular opening to permit fluid flow through the body bore from the first end to the second end.

An o-ring may be positioned around the first portion of the valve body. The first portion of the valve body may include a tapered surface that is of smaller diameter at the first end of the valve body and increases in diameter to the notch. As the valve body is secured between the first and second flanges, the tapered surface is forced into the o-ring. This energizes the o-ring to fluid-tightly seal between the valve body and the first and second flanges.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
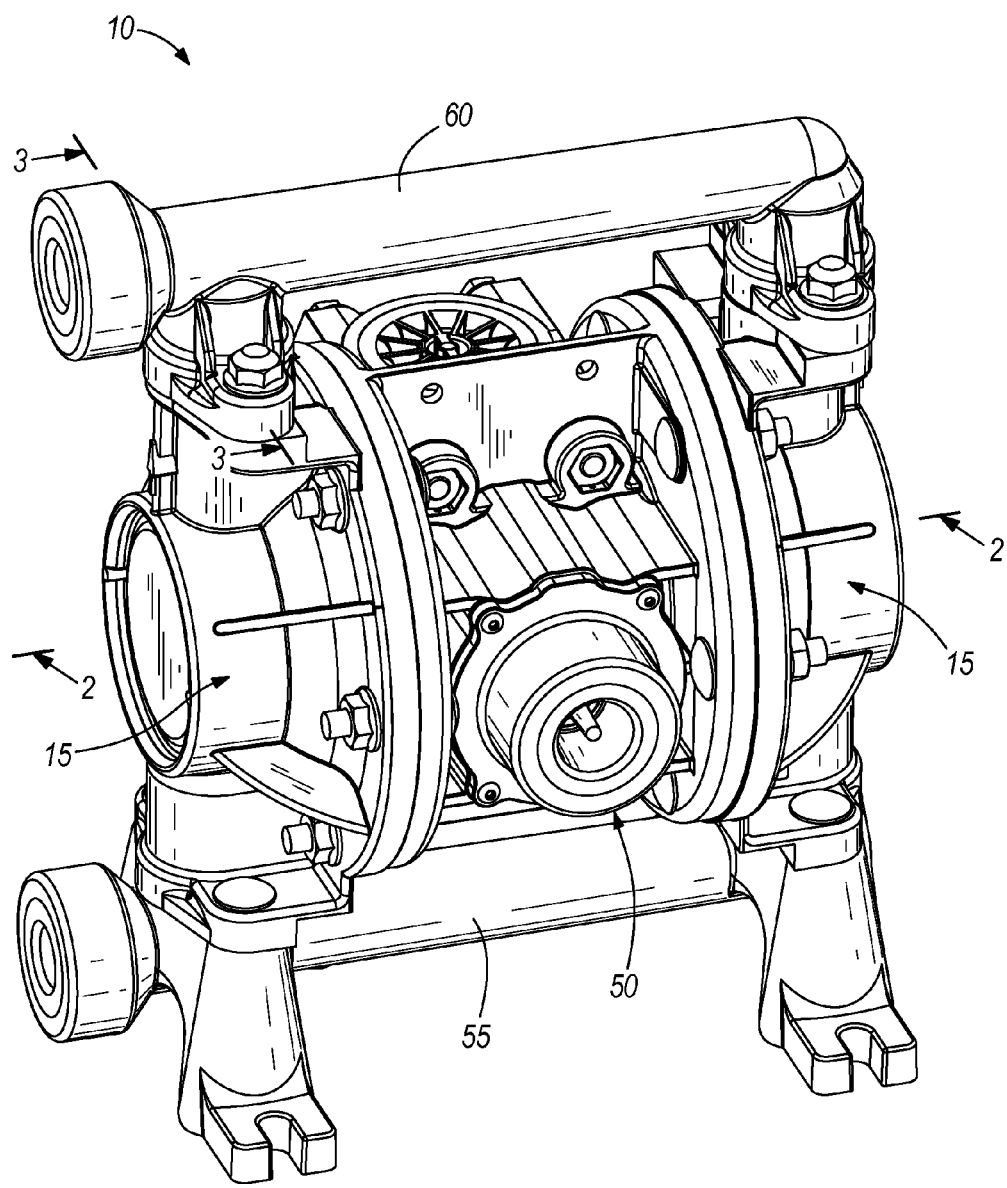
FIG. 1 is a perspective view of a double diaphragm pump embodying the present invention.
Figure 2:
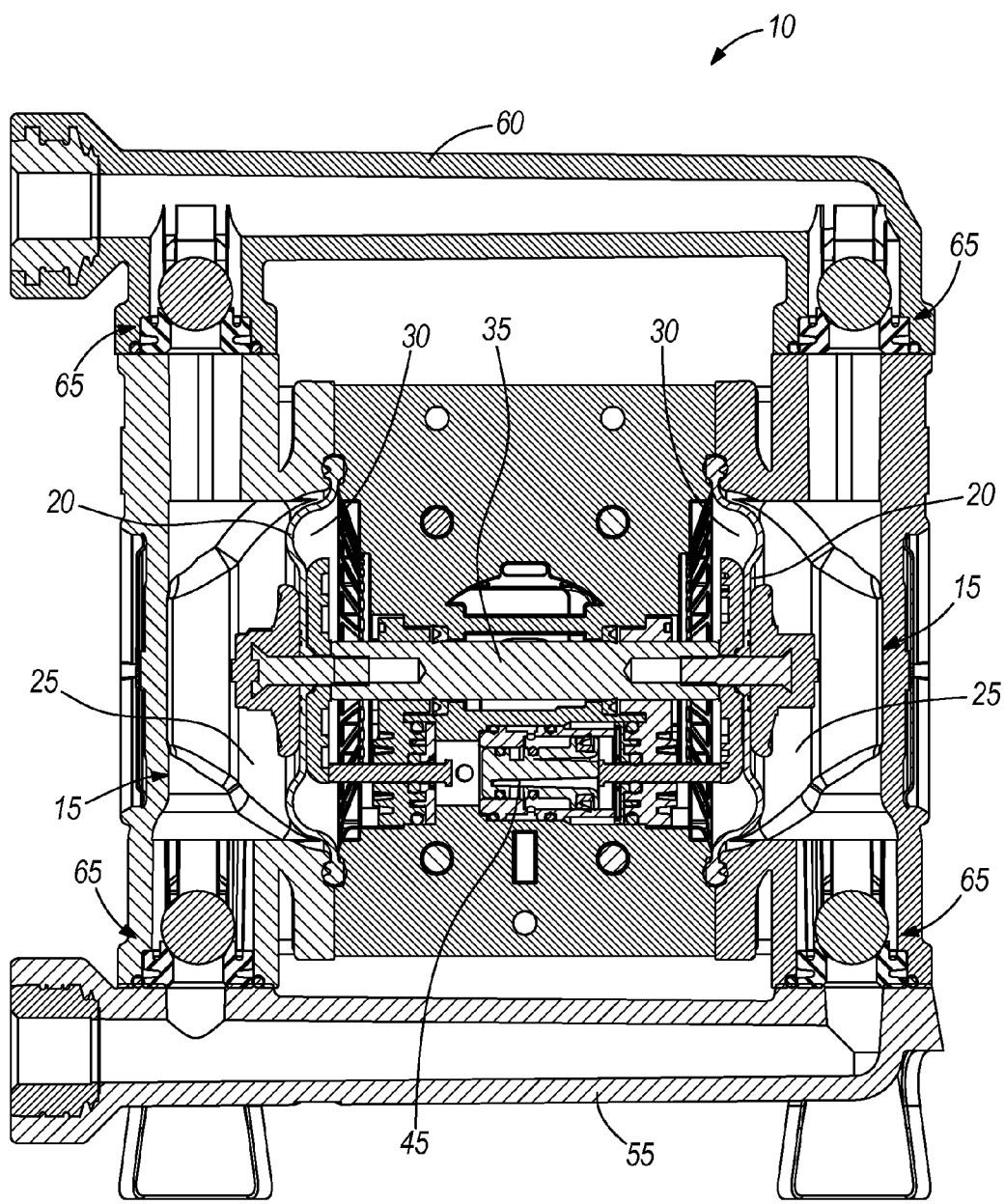
FIG. 2 is a cross-section view of the pump taken along line 2-2 in FIG. 1.

FIGS. 1 and 2 illustrate a double diaphragm pump 10 having a housing defining two working chambers 15. Each working chamber 15 is divided with a flexible diaphragm 20 into a pumping chamber 25 and a motive fluid chamber 30. The diaphragms 20 are interconnected through a shaft 35 for synchronized reciprocating movement, such that when one diaphragm 20 is moved to increase the volume of the associated pump chamber 25, the other diaphragm 20 is simultaneously moved to decrease the volume of the associated pump chamber 25. The pump 10 includes an inlet for the supply of a motive fluid (e.g., compressed air or another pressurized gas) and a valve 45 for alternatingly supplying the motive fluid to the motive fluid chambers 30 to drive reciprocation of the first and second diaphragms 20 and the shaft 35. Simultaneously with supplying the motive fluid to one of the motive fluid chambers 30, the valve 45 places an exhaust assembly 50 in communication with the other motive fluid chamber 30 to permit motive fluid to be expelled therefrom.

In operation, as the diaphragms 20 and shaft 35 reciprocate, the pump chambers 25 alternatingly expand and contract to create respective low and high pressure within the respective chambers 25. The pump chambers 25 communicate with an inlet manifold 55 that is connected to a reservoir containing a fluid to be pumped, and also communicate with an outlet manifold 60 that is connected to a receptacle for the fluid being pumped. Check valve assemblies 65 ensure that the fluid being pumped moves only from the inlet manifold 55 toward the outlet manifold 60. When one of the pump chambers 25 expands, the resulting negative pressure causes the upper check valve assembly 65 associated with the pump chamber 25 to close, causes the lower check valve assembly 65 associated with the pump chamber 25 to open, and draws fluid from the inlet manifold 55 into the pump chamber 25. Simultaneously, the other pump chamber 25 contracts, which creates positive pressure that causes the lower check valve assembly 65 associated with the pump chamber 25 to close, causes the upper check valve assembly 65 associated with the pump chamber 25 to open, and forces fluid into the outlet manifold 60.

Figure 3:
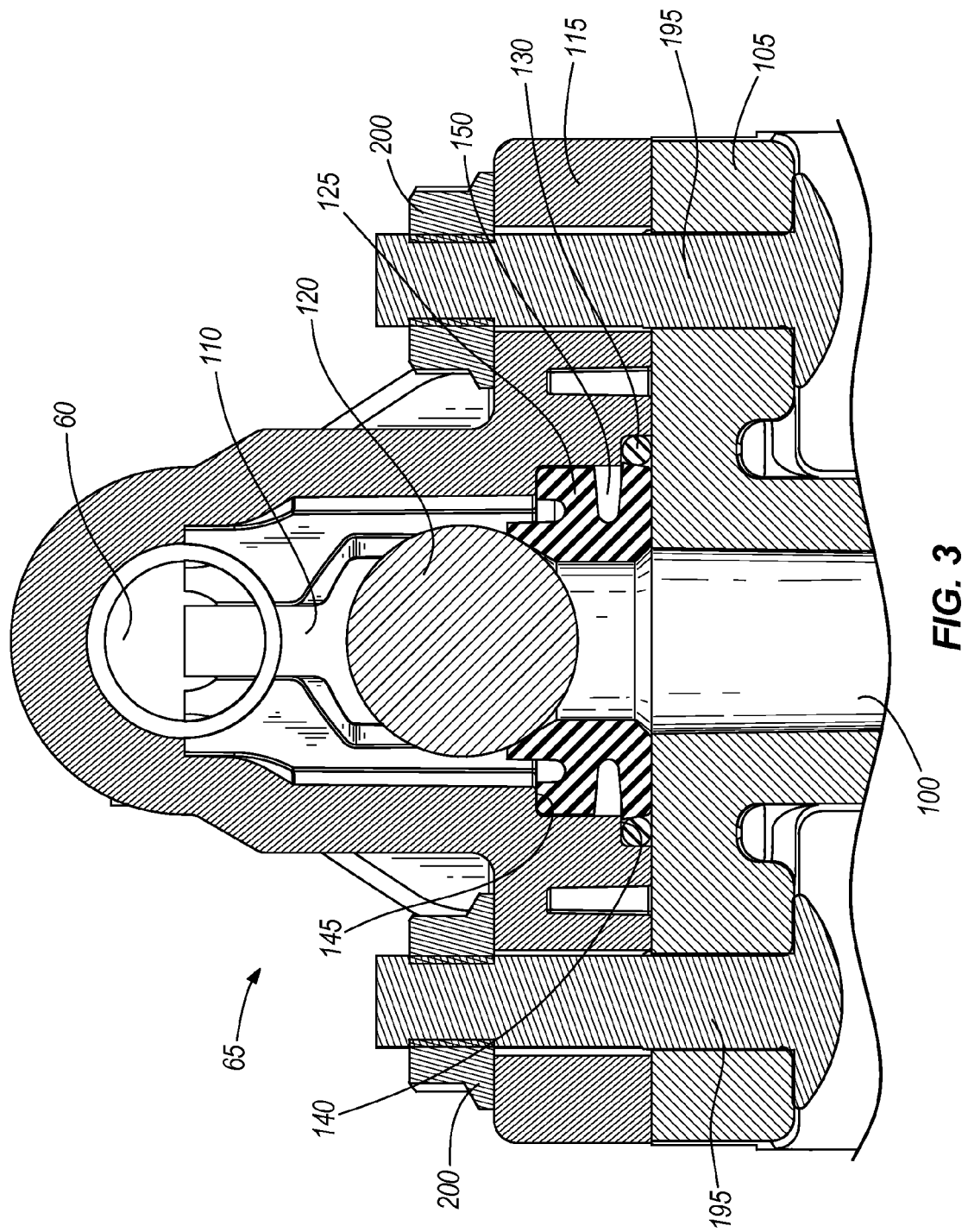
FIG. 3 is a cross-section view of a portion of the pump taken along line 3-3 in FIG. 1.
Figure 4:
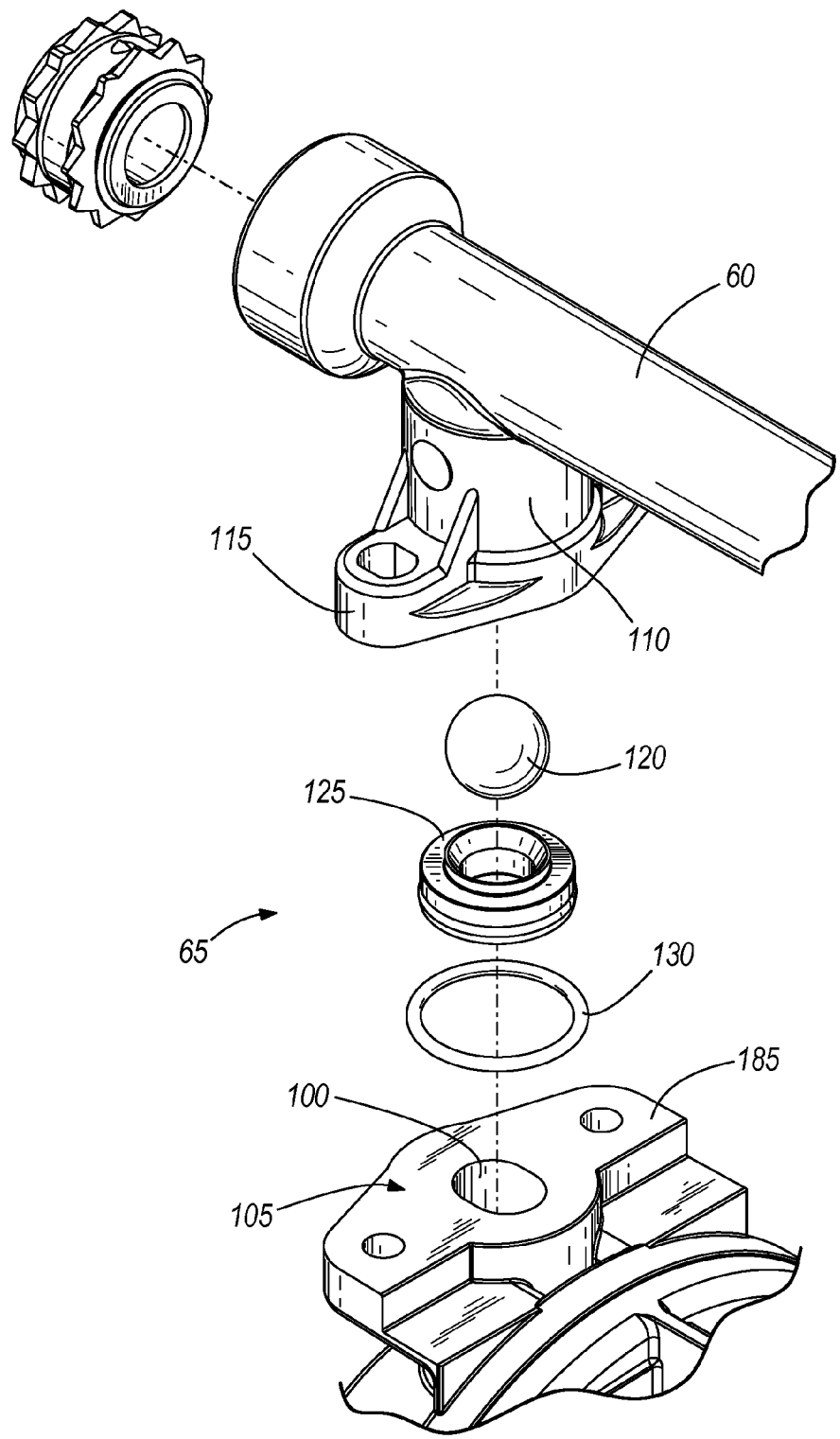
FIG. 4 is an exploded view of a check valve assembly of the pump.
Figure 5:
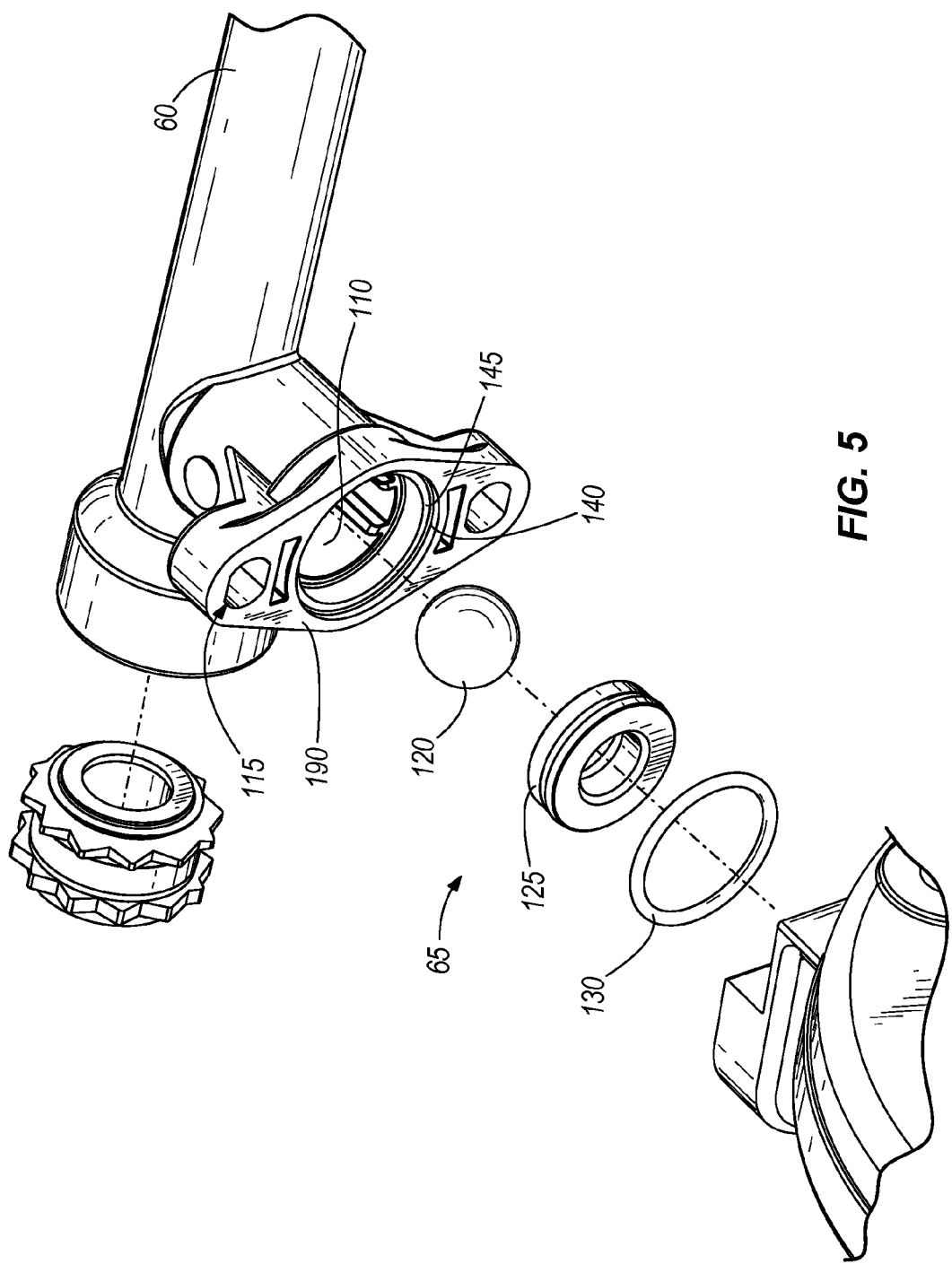
FIG. 5 is another exploded view of the check valve assembly.

Each check valve assembly 65 has a similar construction, which is illustrated in FIGS. 3-5. The check valve assembly 65 includes a first conduit 100 having a first flange 105, a second conduit 110 having a second flange 115 and abutting against the first flange 105, a stopper 120, a valve body 125, and an o-ring 130. In FIGS. 3-5, the first conduit 100 communicates with one of the pump chambers 25 and the second conduit 110 communicates with the outlet manifold 60. In the lower check valves 65, the first conduit 100 would communicate with the inlet manifold 55 and the second conduit 110 would communicate with one of the pump chambers 25. The use of "first" and "second" to describe the conduits 100, 110 is arbitrarily chosen to follow the order and direction in which fluid flows through these conduits (i.e., the check valve assemblies 65 permit flow from the first conduit 100 to the second conduit 110, but not from the second conduit 110 to the first conduit 100). The second flange 115 includes first and second steps 140, 145. The second conduit 110 begins above the second step 145. The illustrated stopper 120 is a ball, but in other embodiments may be a stopper having other shapes and may include an at least partially spherical surface to facilitate sealing against the valve body 125.

Figure 6:
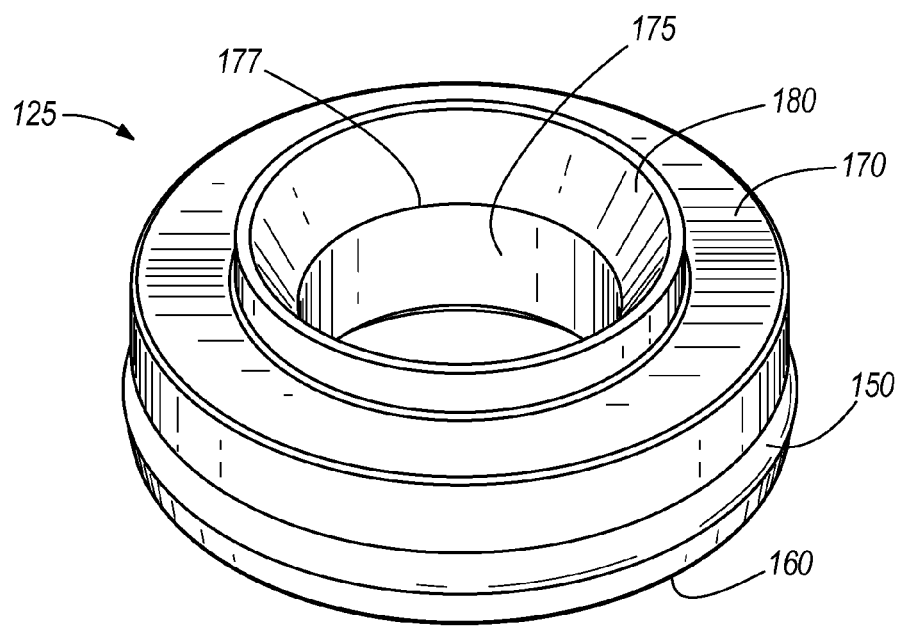
FIG. 6 is a perspective view of a valve body of the valve assembly.
Figure 7:
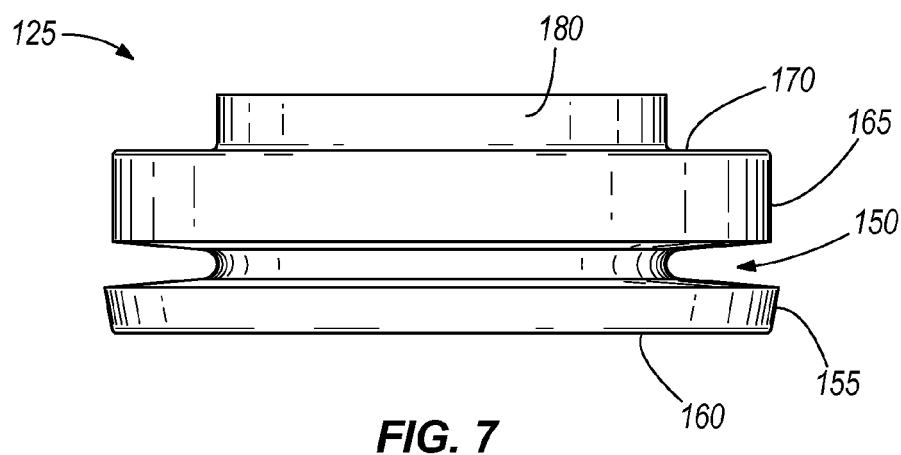
FIG. 7 is a side view of the valve body.

With reference to FIGS. 6 and 7, the valve body 125 is constructed as one piece from a nonmetallic material, which in some embodiments may be an elastomeric material. The valve body 125 has a circumferential notch 150 in an outer surface. The valve body 125 has a first portion 155 between the notch 150 and a first end 160 of the valve body 125, and a second portion 165 between the notch 150 and a second end 170 of the valve body 125. A body bore 175 extends through the valve body 125 between the first and second ends 160, 170 and communicates between the first and second conduits 100, 110. The body bore 175 defines a circular opening 177 in the second end 170 of the body. A lip 180 surrounds the circular opening 177 and defines a generally conical seat surface. When the stopper 120 is drawn against the lip 180 (e.g., when the pressure in the first conduit 100 is lower than the pressure in the second conduit 110), the lip 180 deflects to provide a substantially fluid-tight seal around the at least partially spherical surface of the stopper 120. The lip 180 therefore facilitates sealing the circular opening 177 with the stopper 120.

The first and second flanges 105, 115 each include a mating face 185, 190, respectively. The mating faces 185, 190 abut against each other when the pump 10 is assembled. Fasteners 195 extend through holes in the flanges 105, 115, and nuts 200 are threaded onto the fasteners 195 to securely hold the mating faces 185, 190 against each other. The first conduit 100 is of smaller diameter than the second conduit 110. Spaces are defined between the steps 140, 145 and the mating face 185 of the first flange 105.

The o-ring 130 fits into the space between the mating face 185 and the first step 140, which space is slightly smaller than the cross-sectional diameter or height of the o-ring 130 material so that the o-ring 130 is slightly compressed or deflected. The top of the first portion 155 defines an enlarged surface of slightly larger diameter than that of the second portion 165, and the first portion 155 has a tapered surface between the notch 150 and the first end 160 of the valve body 125. The tapered surface is of smaller diameter at the first end 160 of the valve body 125 and increases in diameter to the notch 150. The tapered surface tapers at a 10° angle in the illustrated embodiment.

The valve body 125 fits into the space between the mating face 185 and the second step 145, with the first end 160 abutting against the mating face 185 and the second end 170 abutting against the step 145. The lip 180 of the valve body 125 extends into the second conduit 110 and the stopper 120 is movable within the second conduit 110 to seat and unseat on the lip 180. The space between the mating face 185 and the second step 145 is equal to the distance between the first and second ends 160, 170 of the valve body 125 so that the valve body 125 is securely retained between the second step 145 and the first mating face 185. The inner diameter of the o-ring 130 is slightly smaller than the outer diameter of the first portion 155 at the first end 160, such that the tapered surface energizes the o-ring 130 as the valve body 125 is pushed against the o-ring 130. The o-ring 130 is backed up against the second flange 115 within the first step 140, and fluid-tightly seals against suction and positive pressure that may cause fluid to flow around the outside of the valve body 125 between the first and second conduits 100, 110 in the absence of the o-ring 130.

The first and second portions 155, 165 seal between the first and second flanges 105, 115, and the lip 180 provides a seat for the stopper 120. In this regard, the valve body 125 is integrally-formed as a single piece with seat and seal portions. During assembly, the valve body 125 may be slightly deformed as it energizes the o-ring 130. The notch 150 absorbs some of the distortion in the valve body 125 to maintain the circularity of the circular opening 177 and the conical shape of the conical surface of the lip 180. In this regard, the notch 150 may be said to "insulate" the circular opening 177 and lip 180 from distortion to facilitate a snug seal for the stopper 120. The stopper 120 prevents fluid flow through the body bore 175 from the second end 170 to the first end 160. Flow through the body bore 175 from the first end 160 to the second end 170 unseats the stopper 120 from the lip 180 to permit fluid flow from the first conduit 100 into the second conduit 110.

It should be noted that, although the illustrated embodiment applies the check valve of the present invention to a double-diaphragm pump, the invention is applicable to substantially any other embodiment in which a check valve is desirable to create one-way flow between first and second conduits. Various features and advantages of the invention are set forth in the following claims.

What is claimed is:

1. A double-diaphragm pump for pumping a fluid to be pumped from reservoir to a receptacle, the pump comprising:
   first and second working chambers;
   a diaphragm in each of the working chambers and dividing each working chamber into a pumping chamber and a motive fluid chamber;
   a shaft interconnecting the diaphragms for synchronized reciprocating movement;
   a valve alternatingly placing one of the motive fluid chambers in communication with a source of pressurized motive fluid while placing the other motive fluid chamber in communication with an exhaust assembly;
   an inlet manifold communicating with the pumping chambers and adapted to communicate with the reservoir;
   an outlet manifold communicating with the pumping chambers and adapted to communicate with the receptacle;
   a check valve assembly operatively positioned between each pumping chamber and each of the inlet and outlet manifolds, each check valve assembly including a first conduit having a first flange, a second conduit having a second flange abutting against the first flange, a stopper, and a valve body, wherein the valve body includes a circumferential notch that divides the body into first and second portions between the notch and respective first and second opposite ends of the body; and
   an o-ring around the first portion of the valve body;
   wherein the valve body includes a body bore extending through the valve body between the first and second ends, the body bore defining a circular opening in the second end of the body, the body bore communicating between the first and second conduits;
   wherein the notch substantially insulates the circular opening from distortion arising from securing the valve body between the first and second flanges;
   wherein the stopper seats against the circular opening to prevent fluid flow through the body bore from the second end to the first end, and unseats from the circular opening to permit fluid flow through the body bore from the first end to the second end;

wherein the first portion of the valve body includes a tapered surface that is of smaller diameter at the first end of the valve body and increases in diameter to the notch; and wherein securing the valve body between the first and second flanges forces the tapered surface into the o-ring and energizes the o-ring to fluid-tightly seal between the valve body and the first and second flanges.

2. The pump of claim 1, wherein the second flange includes first and second steps; wherein the o-ring is secured between the first step and the first flange; and wherein the valve body is secured between the second step and the first flange.

3. The pump of claim 2, wherein the first end of the valve body abuts against the first flange and the second end of the valve body abuts against the second step.

4. The pump of claim 3, wherein the valve body includes an integrally-formed lip surrounding the circular opening and extending from the second end of the valve body into the second conduit; wherein the stopper is positioned within the second conduit; and wherein the lip provides a seating surface for the stopper to facilitate sealing therebetween.

5. The pump of claim 4, wherein the seating surface of the lip is generally conical in shape; and wherein the notch insulates the lip from distortion arising from securing the valve body between the first and second flanges.

6. The pump of claim 1, wherein the valve body is constructed as one piece from a nonmetallic material.

* * * * *